(12) United States Patent
Roy et al.

(10) Patent No.: US 10,629,862 B2
(45) Date of Patent: Apr. 21, 2020

(54) CATHODE INSULATOR DESIGN

(71) Applicant: Greatbatch Ltd., Clarence, NY (US)

(72) Inventors: Mark J. Roy, Buffalo, NY (US); Gary Freitag, East Aurora, NY (US); Joseph M. Lehnes, Williamsville, NY (US); David Dianetti, Lancaster, NY (US)

(73) Assignee: Greatbatch Ltd., Clarence, NY (US)

( * ) Notice: Subject to any disclaimer, the term of this patent is extended or adjusted under 35 U.S.C. 154(b) by 214 days.

(21) Appl. No.: 15/803,973

(22) Filed: Nov. 6, 2017

(65) Prior Publication Data

US 2018/0130978 A1     May 10, 2018

Related U.S. Application Data

(60) Provisional application No. 62/417,790, filed on Nov. 4, 2016.

(51) Int. Cl.
| | |
|---|---|
| *H01M 2/02* | (2006.01) |
| *H01M 6/14* | (2006.01) |
| *H01M 4/38* | (2006.01) |
| *H01M 4/48* | (2010.01) |
| *H01M 2/06* | (2006.01) |
| *H01M 2/14* | (2006.01) |
| *H01M 6/02* | (2006.01) |
| *H01M 2/34* | (2006.01) |

(Continued)

(52) U.S. Cl.
CPC ....... *H01M 2/0277* (2013.01); *H01M 2/0202* (2013.01); *H01M 2/04* (2013.01); *H01M 2/06* (2013.01); *H01M 2/14* (2013.01); *H01M 2/34* (2013.01); *H01M 4/38* (2013.01); *H01M 4/382* (2013.01); *H01M 4/48* (2013.01); *H01M 6/02* (2013.01); *H01M 6/14* (2013.01); *H01M 2004/027* (2013.01); *H01M 2004/028* (2013.01); *H01M 2200/00* (2013.01)

(58) Field of Classification Search
CPC ..... H01M 2004/027; H01M 2004/028; H01M 2200/00; H01M 2/0202; H01M 2/0277; H01M 2/04; H01M 2/06; H01M 2/14; H01M 2/34; H01M 4/38; H01M 4/382; H01M 4/48; H01M 6/02; H01M 6/14
See application file for complete search history.

(56) References Cited

U.S. PATENT DOCUMENTS

| | | |
|---|---|---|
| 5,250,373 A | 10/1993 | Muffoletto et al. |
| 5,744,261 A | 4/1998 | Kuwik et al. |
| 5,750,286 A | 5/1998 | Paulot et al. |

(Continued)

FOREIGN PATENT DOCUMENTS

| | | |
|---|---|---|
| DE | 19858723 | 8/1999 |
| EP | 1742279 | 1/2007 |

OTHER PUBLICATIONS

Extended European Search Report, Application 17200202.4, dated Dec. 20, 2017.

*Primary Examiner* — Adam A Arciero
(74) *Attorney, Agent, or Firm* — Michael F. Scalise

(57) ABSTRACT

Disclosed herein are electrochemical cells that generally relate to the conversion of chemical energy to electrical energy. More particularly, the present disclosure is directed to primary lithium electrochemical cells possessing insulator pocket structures, which substantially envelope cathode components to prevent lithium cluster formation therein.

36 Claims, 4 Drawing Sheets

(51) Int. Cl.
*H01M 2/04* (2006.01)
*H01M 4/02* (2006.01)

(56) References Cited

U.S. PATENT DOCUMENTS

| | | | |
|---|---|---|---|
| 5,882,362 A | 3/1999 | Kuwik et al. | |
| 6,933,074 B2 | 8/2005 | Frustaci et al. | |
| 7,482,093 B1* | 1/2009 | Frustaci | H01M 2/0207 |
| | | | 29/623.1 |
| 7,875,379 B2 | 1/2011 | Moceri et al. | |
| 9,355,789 B2 | 5/2016 | Krehl et al. | |
| 9,368,829 B2 | 6/2016 | Bruch | |
| 9,553,296 B1* | 1/2017 | Dai | H01M 2/22 |
| 2005/0112460 A1* | 5/2005 | Howard | H01M 2/06 |
| | | | 429/180 |

* cited by examiner

CATHODE INSULATOR DESIGN

CROSS-REFERENCE TO RELATED APPLICATIONS

This application claims priority to U.S. Provisional Patent Application Ser. No. 62/417,790 "Insulator Design to Prevent Lithium Clusters," which was filed on Nov. 4, 2016, the entire contents of which are hereby incorporated by reference in its entirety.

FIELD OF THE INVENTION

The present disclosure relates generally to the conversion of chemical energy to electrical energy. In particular, the present disclosure is directed to primary lithium electrochemical cells possessing insulator pocket structures, which substantially envelope cathode components to prevent lithium cluster formation therein.

BACKGROUND OF THE INVENTION

The following description is provided to assist the understanding of the reader. None of the information provided or references cited is admitted to be prior art.

High rate intermittent discharge of a lithium-silver vanadium oxide (Li/SVO) electrochemical cell begets voltage and electrolyte gradients within the cell structure. Subsequent to a high current pulse in this regard, electrochemical species within the cell will spontaneously react toward a thermodynamic equilibrium, i.e., when conditions permit for the net redistribution of such species. In this respect, equilibration of electrolyte gradients, e.g., a lithium ion gradient, occurs insofar as locally concentrated lithium ions are reduced with respect to an anodic substrate within the electrochemical cell. Reduction of such lithium ions, however, precipitates localized substrate polarization, which can result in one or both of lithium cluster formation and surface plating, i.e., as the concentration gradient relaxes. And, to the extent that bridging manifests between the negative and positive cell components—via lithium cluster growth—an internal cell loading mechanism is enabled, which can consequently result in the premature discharge of the cell. As such, the segregation of electrochemical cell components, and specifically the insulation of a cell's cathodic components, is necessary in many circumstances to curtail the deleterious effects of lithium cluster formation and surface plating.

SUMMARY

In one aspect, the present disclosure is directed to an electrochemical cell entailing a casing including a container having a sidewall extending to an opening end, and a lid configured to close the opening end, an electrode assembly housed inside the casing, where the electrode assembly includes an anode comprising lithium supported on an anode current collector, and at least one anode lead conductively connecting the anode to the casing, a cathode entailing a cathode active material supported on a cathode current collector, where the cathode current collector includes a cathode tab extending outwardly beyond a perimeter edge of the cathode, and where the cathode tab is conductively connected to a terminal pin extending through an opening in the lid, the cathode tab and terminal pin being electrically insulated from the casing, and at least one separator positioned between the anode and the cathode to prevent direct physical contact therebetween.

In illustrative embodiments, the electrochemical cell also includes an insulator compartment residing between the cathode and the casing to house the cathode tab conductively connected to the terminal pin, and an electrolyte provided in the casing to activate the electrode assembly. In suitable embodiments, the insulator compartment entails a first insulator member having a first surrounding sidewall meeting a first major face wall, where the first major face wall is disposed adjacent to an inner surface of the lid with the first surrounding sidewall extending towards the cathode, and where the first major face wall has a first opening for the terminal pin, and a second insulator member having a second surrounding sidewall meeting a second major face wall, where the second major face wall is disposed adjacent to the cathode perimeter edge with the second surrounding sidewall extending towards the lid, and where the second major face wall has a second opening for the cathode tab.

The first and second insulator members are matable, in suitable embodiments, with a first outer edge of one of the first and second surrounding sidewalls facing the other of the first and second major face walls and with at least a portion of the second surrounding sidewall being in an overlapping, direct contact relationship with at least a portion of the first surrounding sidewall to thereby form the insulator compartment. In certain embodiments, the insulator compartment resides between the cathode and the lid to house the cathode tab conductively connected to the terminal pin. In illustrative embodiments, the electrode assembly further includes at least two cathode plates, each having a cathode tab conductively connected to the terminal pin inside the insulator compartment, and where at least a portion of the anode resides between the at least two cathode plates.

In suitable embodiments, the anode has a serpentine shape with at least two pairs of cathode plates interleaved between respective folds of the serpentine anode, and where each pair of cathode plates has a pair of cathode tabs housed inside the insulator compartment where they are conductively connected to a cathode bridge, which in turn is conductively connected to the terminal pin. In particular embodiments, the second opening is configured to receive the cathode tabs and the cathode bridge and further extend beyond an outer periphery thereof to define an uncovered region, where the uncovered region is operably configured to prevent lithium cluster formation within the insulator compartment.

The first outer edge of one of the first and second surrounding sidewalls, in certain embodiments, contacts the other of the first and second major face walls. In illustrative embodiments, the electrode assembly has an upper surface possessing a plurality of cavities operably configured to facilitate lithium cluster deposition therein. In some embodiments, the electrode assembly has an uninsulated upper surface possessing a plurality of cavities operably configured to facilitate lithium cluster deposition thereon. In illustrative embodiments, the cathode active material is selected from silver vanadium oxide, copper silver vanadium oxide, $V_2O_5$, $MnO_2$, $LiCoO_2$, $LiNiO_2$, $LiMn_2O_4$, $TiS_2$, $Cu_2S$, $FeS$, $FeS_2$, $Ag_2O$, $Ag_2O_2$, $CuF_2$, $Ag_2CrO_4$, $CF_x$, copper oxide, and copper vanadium oxide, and mixtures thereof.

The second major face wall, in some embodiments, is disposed adjacent to the cathode perimeter edge to define a gap that extends from the second surrounding sidewall of the insulator compartment to an inner surface of the container sidewall when the electrode assembly is housed therein. In illustrative embodiments, the terminal pin extending through the opening in the lid is supported in a ferrule by an electrically insulating material, the ferrule being electrically connected to the casing. In illustrative embodiments, the terminal pin is composed of molybdenum and is received in a couple that is conductively connected to the cathode tab by a conductive ribbon.

In illustrative embodiments, the insulator compartment is composed of a material that is substantially impervious to lithium ion flow therethrough and selected from polyethylene, polyethylenechlorotrifluoroethylene, ETFE, polypropylene, and PTFE, and combinations thereof. In some embodiments, an insulator bag partially enveloping the electrode assembly. In illustrative embodiments, the casing is configured as a deep drawn casing structure. In illustrative embodiments, the insulator compartment inhibits fluid flow communication of the electrolyte between the electrode assembly and the at least one anode lead conductively connected to the casing to an extent sufficient to prevent conditions favorable for the formation of lithium clusters between the electrode assembly and the at least one anode lead conductively connected to the casing. In illustrative embodiments, the electrochemical cell is dischargeable without lithium precipitating from the electrolyte in an amount sufficient to permit internal loading of the electrochemical cell.

In one aspect, the present disclosure provides an insulator assembly that entails a first insulator member having a first surrounding sidewall meeting a first major face wall, where the first major face wall is disposed adjacent to an inner surface of a lid with the first surrounding sidewall extending towards a cell stack assembly, where the cell stack assembly includes a lithium anode, a cathode, and at least one separator disposed between the anode and the cathode to prevent direct physical contact, a second insulator member having a second surrounding sidewall meeting a second major face wall, where the second major face wall is disposed adjacent to a perimeter edge of the cell stack assembly with the second surrounding sidewall extending towards the lid, and wherein the second major face wall has a window.

In some embodiments, the first and second insulator members are matable with a first outer edge of one of the first and second surrounding sidewalls facing the other of the first and second major face walls and with at least a portion of the second surrounding sidewall being in an overlapping, direct contact relationship with at least a portion of the first surrounding sidewall to define an insulator compartment. In illustrative embodiments, a casing configured to receive the cell stack assembly is provided, where the casing comprises the lid and a container having a sidewall extending to an open end, and where the lid is configured to close the open end, an electrolyte provided in the casing to activate the cell stack assembly.

In certain embodiments, the lithium anode is supported on an anode current collector, where at least one anode lead conductively connects the anode to the casing. In some embodiments, the cathode includes a cathode active material supported on a cathode current collector, where the cathode current collector comprises at least one cathode tab extending outwardly beyond a perimeter edge of the cathode, and where the at least one cathode tab is conductively connected to a terminal pin extending through an opening in the first major sidewall and the lid, the cathode tab and terminal pin being electrically insulated from the casing in the insulator compartment.

The insulator compartment resides between the cathode and the lid, in certain embodiments, to house the at least one cathode tab conductively connected to the terminal pin. In suitable embodiments, the cathode further entails at least two cathode plates, each having a cathode tab conductively connected to the terminal pin inside the insulator compartment, where at least a portion of the anode resides between the at least two cathode plates. In illustrative embodiments, the anode has a serpentine shape with at least two pairs of cathode plates interleaved between respective folds of the serpentine anode, where each pair of cathode plates has a pair of cathode tabs housed inside the insulator compartment where they are conductively connected to a cathode bridge, which in turn is conductively connected to a terminal pin.

The window, in illustrative embodiments, is configured to receive the cathode tabs and the cathode bridge and further extend beyond an outer periphery thereof to define an uncovered region, where the uncovered region is operably configured to prevent lithium cluster formation within the insulator compartment. In some embodiments, the first outer edge of one of the first and second surrounding sidewalls contacts the other of the first and second major face walls. In illustrative embodiments, the anode has an upper surface possessing a plurality of cavities operably configured to facilitate lithium cluster deposition thereon. In some embodiments, the electrode assembly has an uninsulated upper surface possessing a plurality of cavities operably configured to facilitate lithium cluster deposition thereon.

The insulator assemblies of the present invention have a cathode active material selected from silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, $CF_x$, copper oxide, and copper vanadium oxide, and mixtures thereof, in some embodiments. In illustrative embodiments, the second major face wall is disposed adjacent to the cell stack assembly perimeter edge to define a gap that extends from the second surrounding sidewall of the insulator compartment to an inner surface of the container sidewall when the cell stack assembly is housed therein. In illustrative embodiments, the terminal pin is supported in a ferrule by an electrically insulating material, the ferrule being electrically connected to the casing.

In illustrative embodiments, the terminal pin is composed of molybdenum and is received in a couple or coupling member that is conductively connected to the cathode tab by a conductive ribbon. In illustrative embodiments, the insulator compartment is composed of a material substantially impervious to lithium ion flow therethrough and selected from polyethylene, ETFE, polyethylenechlorotrifluoroethylene, polypropylene, and PTFE, and combinations thereof. In suitable embodiments, the insulator assemblies further include an insulator bag partially enveloping the cell stack assembly.

In certain embodiments, the casing is configured as a deep drawn casing structure. In some embodiments, the insulator compartment inhibits fluid flow communication of the electrolyte between the cell stack assembly and the at least one anode lead conductively connected to the casing to an extent sufficient to prevent conditions favorable for the formation of lithium clusters between the cell stack assembly and the at least one anode lead conductively connected to the casing.

In one aspect, the present disclosure provides a method of preventing, reducing, or redistributing lithium clusters in an electrochemical cell entailing the steps of: (a) providing a casing having a container having a sidewall extending to an opening end, and a lid configured to close the opening end; (b) providing an electrode assembly that includes (i) an anode of lithium supported on an anode current collector, and at least one anode lead; (ii) a cathode having a terminal pin extending through an opening in the lid, and a cathode active material supported on a cathode current collector, where the cathode current collector includes at least one cathode tab extending outwardly beyond a perimeter edge of the cathode; and (iii) at least one separator positioned between the anode and the cathode to prevent direct physical contact.

The methods further include the steps of: (c) providing an insulator compartment residing between the cathode and the lid; (d) housing the at least one cathode tab and at least a portion of the terminal pin in the insulator compartment; (e) electrically connecting the at least one anode lead to the casing as the anode terminal and electrically connecting the at least one cathode tab to the terminal pin; (f) closing the container with the lid to provide the casing housing the electrode assembly; and (g) activating the electrode assembly with an electrolyte provided in the casing.

In certain embodiments, the insulator compartment is formed by: (i) providing a first insulator member having a first surrounding sidewall meeting a first major face wall, where the first major face wall has a first opening for the terminal pin; (ii) disposing the first major face wall adjacent to an inner surface of the lid with the first surrounding sidewall extending towards the cathode; (iii) providing a second insulator member having a second surrounding sidewall meeting a second major face wall, where the second major face wall has a second opening for the at least one cathode tab; (iv) disposing the second major face wall adjacent to the cathode perimeter edge with the second surrounding sidewall extending towards the lid; and (v) mating a first outer edge of one of the first and second surrounding sidewalls facing the other of the first and second major face walls such that at least a portion of the second surrounding sidewall overlaps and is in direct contact with at least a portion of the first surrounding sidewall to thereby form the insulator compartment.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

FIG. 1A is a partially exploded isometric view of an illustrative representation concerning electrochemical cell 100 of the present invention. FIG. 1B is an enlarged partially exploded elevational view of an illustrative representation concerning electrochemical cell 101 of the present invention.

FIG. 2A is an open enlarged view of an illustrative representation concerning insulator compartment 200 of the present invention. FIG. 2B is a phantom-closed elevational view of an illustrative representation concerning electrochemical cell 201 of the present invention.

DETAILED DESCRIPTION

Figure 1A:
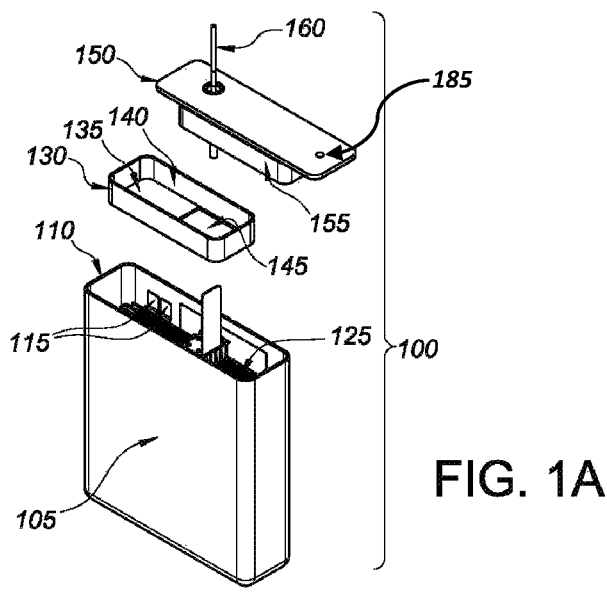
FIGS. 1A-1B show partially exploded elevational views of illustrative representations concerning electrochemical cells of the present invention.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As used herein, unless otherwise stated, the singular forms "a," "an," and "the" include plural reference. Thus, for example, a reference to "an insulator" can include a plurality of insulators.

As used herein, the term "about" will be understood by persons of ordinary skill in the art and will vary to some extent depending upon the context in which it is used. If there are uses of the term which are not clear to persons of ordinary skill in the art, given the context in which it is used, the term "about" in reference to quantitative values will mean up to plus or minus 10% of the enumerated value.

The terms "assessing" and "evaluating" are used interchangeably to refer to any form of measurement, and includes determining if an element is present or not. The terms "determining," "measuring," "assessing," and "assaying" are used interchangeably and include both quantitative and qualitative determinations. Assessing may be relative or absolute. "Assessing the presence of" includes determining the amount of something present, as well as determining whether it is present or absent.

As used herein, the terms "compartment" or "compartments" refer to devices or chambers that support an electrochemical cell of the present invention, typically such a cell is built in a case-negative design with the outer casing serving as the anode terminal. However, the cells of the present invention can also be built in a case-positive or case-neutral design. A compartment may have various environmental conditions, such as, but not limited to, electrolytic species, metal and/or gas content, e.g., air, oxygen (or lack of oxygen), nitrogen (or lack of nitrogen), carbon dioxide, electrode materials, separators, flow rates, temperature, pH, humidity, and insulator components. Compartments can be of any size, shape, or material, and of any configuration that will physically maintain the various components of an electrochemical cell of the present invention, including an electrolytic species, capable of activating an electrochemical cell of the present disclosure.

As used herein, the term "composition" refers to a product, material, device or component with specified or particular materials, polymers, compounds, etc., in the specified amounts, as well as any products or the generation of such products which result, directly or indirectly, from combination of the specified items in the specified amounts.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. Such terms, in some embodiments, may refer to a physical and/or conductive, i.e., electrical, joining or communication between two or more components or members of the present invention.

As used herein, the terms "cooperatively interact" or "cooperatively interacting" refer to the association of two or more adjoining components, where each component functions to facilitate the association. For example, a fitted plug would cooperatively interact with the component that the plug was fabricated to fit.

As used herein, the terms "disengage" or "disengaged configuration", both refer to act or state of no longer being securely associated or connected. For example, two components are disengaged with each other they are not in physical contact with each other. However, such components can be in contact while concomitantly occupying a disengaged state. In this circumstance, the components would not be securely engaged by such means as, for example, a locking mechanism. If such components are "reversibly disengaged" then the components are capable of engaging at a different time. The foregoing holds true for an engagement or disengagement with respect to an electrical or conductive connection.

As used herein, the terms "engage", "reversible engage", "reversibly engaged", and "engaged configuration" all refer to the act or state of being associated or connected in a secure manner for the purpose of joining two or more components for a period of time. For example, two components are engaged with each other when they are in contact and securely connected or associated for a period of time. To be in the engaged state, the components are in contact while concomitantly occupying an engaged state, such as, for example, a locked state. If such components are "reversibly engaged" then the components can be engaged and disengaged with respect to the features enabling such association and disassociation, respectively. The foregoing holds true for an engagement or disengagement with respect to an electrical or conductive connection.

As used herein, the term "encapsulation" or "encapsulating" refers to the retention of substance within a compartment, delineated by a physical barrier. For example, the encapsulated components described herein refer to components which are retained within, and surrounded by a physical barrier, such as a pocket or seal.

As used herein, an "electrochemical cell" or "cell" according to the present invention, refers to, for example, but is not limited to, a primary lithium battery that has sufficient energy density and discharge capacity in order to be a suitable power source for an implantable medical device. Contemplated medical devices include implantable cardiac pacemakers, defibrillators, neurostimulators, drug pumps, ventricular assist devices, and the like.

As used herein, the term "electrode" refers to an anode or a cathode and/or active materials thereof, including, but not limited to, selected from silver vanadium oxide, copper silver vanadium oxide, manganese dioxide, cobalt oxide, nickel oxide, copper oxide, titanium disulfide, copper sulfide, iron sulfide, iron disulfide, copper vanadium oxide, carbon, fluorinated carbon, vanadium oxide, $LiCoO_2$, $LiNiO_2$, $LiMn_2O_4$, $Ag_2O$, $Ag_2O_2$, $CuF_2$, $Ag_2CrO_4$, and combinations thereof, for example, with respect to the cathode active materials. Concerning anode active materials, for example only, typically lithium metal, lithium metal alloys, and similar types of metals, are used, such that they are capable of reversibly retaining an electrolytic species, e.g., lithium species. In other embodiments, for example only, carbonaceous negative (anodic) materials may comprising any of the various forms of carbon, such as, e.g., coke, graphite, acetylene black, carbon black, glass carbon, "hairy carbon," etc., which are capable of reversibly retaining an electrolytic species, e.g., lithium species. The "anode" in this regard is an electrode that facilitates the oxidation, i.e., the loss of electrons, of various electrolytic species or constituents of an electrochemical cell of the present invention, while the "cathode" is an electrode that facilitates the reduction, i.e., gaining of electrons, of an oxidant, of various electrolytic species or constituents of an electrochemical cell of the present invention.

It should be noted that the term "exemplary" as used herein to describe various embodiments is intended to indicate that such embodiments are possible examples, representations, and/or illustrations of possible embodiments, i.e., where such terms are not intended to connote that such embodiments are necessarily extraordinary or superlative examples with respect to the referred to embodiments of the present invention.

As used herein, "prevention" or "preventing" of a result or condition refers to a method or process that, in a statistical sample, reduces the occurrence of, for example, lithium clustering, in a sample electrochemical cell relative to an control electrochemical cell.

The term "pulse," as used herein, refers to a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses. An exemplary pulse train may consist of one to four 5 to 20-second pulses with about a 2 to 30 second rest, preferably about 15 second rest, between each pulse, in some embodiments. A typical range of current densities for cells powering implantable medical devices is from about 19 $mA/cm^2$ to about 50 $mA/cm^2$, and more preferably from about 18 $mA/cm^2$ to about 41 $mA/cm^2$. In illustrative embodiments, a 10 second pulse is suitable for medical implantable applications. However, it could be significantly shorter or longer depending on the specific cell design and chemistry and the associated device energy requirements. Current densities are based on square centimeters of the cathode electrode.

As used herein, the terms "substantial" or "substantially" within the context of a "substantially enveloped" surface or region or a "substantially aligned" configuration, refer to, e.g., total or complete envelopment or alignment, and the like, but also includes lesser than complete or total envelopment or alignment, and the like, insofar as the intended purpose for performing the act can be carried out to the same extent as if the, e.g., envelopment or alignment, were total or complete.

As used herein, the term "wettability" or "wetting" refers to the ability of a substance to maintain surface contact with a different substance or surface. Surface contact results from intermolecular interactions between a substance and the contacted surface. Wetting, and the surface forces that control wetting, are also responsible for other related effects, including capillary action or capillary effects. In this regard, the wettability, or degree of wetting, can be calculated in terms of the force balance between the adhesive and cohesive forces. Wettability can be altered by, for example, adding different combinations and concentrations of materials to, for example, components of an electrochemical cell.

Lithium Cluster Electrochemistry

Lithium clusters typically emanate from a local concentration of lithium ions in an electrolyte immediately adjacent to a surface, which thereby creates an anodically polarized region and accordingly results in the reduction of lithium ions onto the surface as the concentration gradient relaxes. In this respect, lithium ion concentration gradients are typically borne out of the high rate intermittent discharge of a lithium/silver vanadium oxide (Li/SVO) cell. And, insofar as lithium cluster formation accumulates to the extent of bridging a cathodic region of an electrochemical cell with an anodic component, an internal loading mechanism is actuated, which can prematurely discharge the cell.

The underlying mechanism concerning anodic lithium deposition precipitating from high rate case-negative primary lithium electrochemical cells is generally described in Takeuchi et al., "Lithium Deposition in Prismatic Lithium Cells during Intermittent Discharge." *Journal of the Electrochemical Society*, Vol. 138, L44-L45, (1991). While this publication concerns Li/SVO systems, it is noted that such mechanisms also apply to other solid insertion cathodes employed in lithium cells where the voltage decreases with discharge. Nevertheless, at equilibrium, lithium cluster formation is coterminous with an increase in the concentration of lithium ions on an electrode surface, which anodically polarizes a local region of the electrode surface with respect to the electrode-electrolyte interface.

Lithium ions, in this respect, are reduced in the local region of higher concentration, where lithium metal is consequently oxidized over the remaining portion of the electrode until the concentration gradient is relaxed. The concentration gradient may also be relaxed by diffusion of lithium ions from the region of high concentration to low concentration. So long as such a concentration gradient persists, however, lithium deposition is thermodynamically favored in local regions of high lithium ion concentration.

More specifically with respect to Li/SVO batteries, moreover, lithium ions are discharged at the anode and subsequently intercalated into the cathode. And, because the anode and cathode of such an electrochemical cells are placed in close proximity, e.g., across a thin separator in many instances, immediately following a pulse discharge, the ion concentration gradient in the separator dissipates as the lithium ions diffuse from the anode to the cathode, and accordingly within the pore structure of the cathode. Nonetheless, at the electrode assembly edge, the anode perimeter is not diametrically opposed by the cathode edge. As such, if excess electrolyte pools at this region, the discharged lithium ions have a greater diffusion pathway to the cathode compared to lithium ions discharged into the separator. Consequently, this electrolyte pool maintains a higher lithium ion concentration, and for increased intervals, following the pulse discharge.

It follows that, inasmuch as lithium anode tabs are typically welded inside a casing of an electrochemical cell, excess electrolyte wetting in this region functions to facilitate the expansion of the concentration gradient over the tab and to the casing. Consequently, lithium clusters precipitate onto these surfaces via an anodic potential shift that emanates from the increased lithium ion concentration in the electrolyte pool, i.e., subsequent to a pulse discharge. The present invention addresses and solves the foregoing issues as follows and as detailed herein.

Technology Overview

The present invention relates to, inter alia, novel electrochemical cell and insulator assembly designs and methods for making and using the same. Such aspects of the present invention consequently provide for the prevention, reduction and/or redistributing of lithium clusters with respect to an electrochemical cell, and more specifically with respect to a Li/SVO cell. In this regard, and in concert with an electrode assembly as further detailed herein, the insulator assemblies of the present invention are generally composed of a first insulator member having a first surrounding sidewall meeting a first major face wall, where the first major face wall is disposed adjacent to an inner surface of a lid with the first surrounding sidewall extending towards a cell stack assembly, which, in some embodiments, may also be referred to as an electrode assembly.

Likewise, a second insulator member has a second surrounding sidewall meeting a second major face wall, where the second major face wall is disposed adjacent to a perimeter edge of the cell stack assembly with the second surrounding sidewall extending towards the lid, where the second major face wall has a window. The first and second insulator members, moreover, are matable with a first outer edge of one of the first and second surrounding sidewalls facing the other of the first and second major face walls and with at least a portion of the second surrounding sidewall being in an overlapping, direct contact relationship with at least a portion of the first surrounding sidewall.

Taken together, the two insulator members define an insulator compartment in illustrative embodiments. Without completely expounding upon the cell stack assembly for the moment, the insulator compartments of the present invention, in some embodiments, functions to insulate, isolate, separate and/or segregate various cathodic components of an electrochemical cell from the anodic components and the casing so as to prevent a short circuit between the lid and/or casing and the cathode components, which would otherwise ensue in the presence of lithium clusters, i.e., if the cathode components were left unprotected in the absence of the insulator compartment.

More specifically, the protective features of the insulator compartment are borne out of shrouded insulator members that are disposed in an overlapping engagement to form a sealed compartment that electrically insulates cathodic components from the balance of the cell stack components, including the anodic components and conductive casing. In certain embodiments, and as generally illustrated in the drawings, the cathodic components are selected from, but not limited to, for example, at least a portion of a terminal pin 160, a coupling member 310, a conductive ribbon 635, a cathode bridge 120, and one or more cathode tabs 380 that are in electric communication with respective pairs of cathode plates 335 composed of cathode active materials supported on a cathode current collector.

The insulator compartment 205, furthermore, possesses a window or opening 145 for receiving one or more of the cathode components, including a cathode bridge assembly in some embodiment. And, in particular embodiments, the size and configuration of the window or opening functions as an electrolytic conduit for subsequent lithium cluster deposition at non-critical regions of the electrochemical cell, i.e., regions away from the cathodic components. To this end, the cell stack further entails cluster cavities 235 that facilitate or allow for local lithium cluster deposition therein. In some embodiments, the electrode assembly has an uninsulated upper surface possessing a plurality of cavities operably configured to facilitate lithium cluster deposition thereon.

In electrochemical cells where the lithium anode and the outer conductive case and lid are at the same electrical potential, it has been determined, according to the present invention that internal electrical loading and short circuiting can result from formation of lithium clusters between surfaces at the cathode and anode potentials. To the extent that any direct path exists between anode and cathode potential surfaces, the formation of such lithium clusters is enhanced. As such, and in accordance with the present invention, the insulator compartment functions as a barrier that impedes such a direct path between the anodic and cathodic surfaces and thus effectively isolates the relevant cell components, i.e., of different electrical potential, thereby preventing internal electrical loading and short circuiting caused by the lithium cluster formation.

Electrochemical Cell Components and Insulators

The present disclosure concerns the redistribution, reduction, and prevention of lithium clusters from bridging between the negative and positive portions of a primary electrochemical cell during and/or following high rate discharge. As such, the present technology curtails early battery depletion emanating from internal loading via lithium cluster shorting between anodic and cathodic components. Lithium cluster prophylaxis in this regard is enabled through the introduction of an insulting compartment, which forms a seal around various cathode components, which accordingly isolates those components from the anodic components of an electrochemical cell assembly, including the casing. In illustrative embodiments, this seal prevents lithium clusters, that typically form on the cell casing and anode leads, from entering the insulator compartment.

Along these lines, the present disclosure entails a cell stack assembly 170, which is also referred to as an electrode assembly, in some embodiments, that has an upper surface possessing a plurality of cavities 235 configured to redirect lithium cluster deposition away from the cathodic components, including the insulator compartment, by providing an increased surface area and volume for receiving such lithium cluster deposits. Likewise, the window opening of a second insulator member is configured, in some embodiments, to allow lithium clusters to be dispersed over relatively large area such that they do not locally concentrate in any specific region when deposited. Such lithium cluster dispersion works in concert with the cavities noted above to ensure that any lithium cluster formation is marginalized to the extent that shorting events pursuant to lithium cluster bridging can be substantially abrogated. In some embodiments, the electrode assembly has an uninsulated upper surface possessing a plurality of cavities operably configured to facilitate lithium cluster deposition thereon.

The cell stack assemblies or electrode assemblies of the present invention are housed in a casing, in illustrative embodiments, where the casing is composed of a container 105 having a sidewall extending to an opening end and a lid 150 configured to close the opening end. In this respect, the electrode assemblies typically include an anode of lithium supported on an anode current collector, and at least one anode lead conductively connecting the anode to the casing.

In suitable embodiments, a lithium anode 225 is further composed of one or more anode plates, preferably two or more anode plates, and at least one anode lead 115 electrically connected to the casing to form an anode terminal. In this regard, the anode plates of the present invention entail a continuous elongated element or structure of alkali metal, preferably lithium or lithium alloy, enclosed within a separator material and folded into a plurality of sections interposed between cathode plates, as more fully described below and herein. The anode assemblies of the present invention, moreover, include an elongated continuous band-like anode current collector in the form of a thin metal screen, which, for example, may be composed of nickel or other appropriate metal, metal alloy or composite. The anode current collector in this respect includes two anode lead tabs 215 extending from the anode current collector.

Furthermore, the anodes of the present invention are assembled into elongated lithium sheets or plates pressed together against opposite sides of the anode current collector. These lithium sheets are substantially equal to, or slightly larger than, the width and length of the anode current collector with the result that the anode is of a sandwich-like construction. In some embodiments, the anode is configured as anode plates. In some embodiments, the anode is enclosed or enveloped in a separator material, for example of polypropylene or polyethylene, and folded at spaced intervals along its length to form a serpentine-like structure that receives a plurality of cathode structures between the folds to form the electrode assembly or cell stack assembly.

As generally depicted in FIGS. 1-4, which are detailed in full below and herein, the present anode components are folded at spaced intervals to provide anode plates along the length thereof. See generally, embodiments 100, 101, 200, 201, 300. A plurality of cathode plates more fully detailed below and herein are received between adjacent anode plates to form a cell stack assembly 170, 230, 330 that is received in the cell casing container 105, 270, 370. Various interleaved anode-cathode plate configurations 125 are envisaged with respect to the present invention to form the attendant cell stack structures, i.e., depending on the requirements needed concerning the electrochemical cell.

Continuing from above, the electrode assemblies detailed herein also have a cathode 335 of a cathode active material supported on a cathode current collector, where the cathode current collector includes at least one cathode tab 380 extending outwardly beyond a perimeter edge of the cathode, and where the cathode tab is conductively connected to a terminal pin 360 extending through an opening 420 in the lid, the cathode tab and terminal pin being electrically insulated from the casing. In particular embodiments, at least one separator is positioned between the anode and the cathode to prevent direct physical contact therebetween.

In accord, the cathodes of the present invention include at least one, and preferable two or more, cathode plates. In this respect, the assemblies of the present invention include cathode plate structure entailing cathode plates joined together by at least one intermediate connector. Such cathode plates, moreover, include cathode active material structures in contact with one or more cathode current collector segments in an intermediate conductor region. In FIGS. 1-4, cell stack assemblies 170, 230, 330 entail a plurality of such cathode structure assemblies. In some embodiments, a manifold is connected to each of the intermediate cathode conductors.

Cathode current collectors in this regard are configured, in certain embodiments, as imperforated thin metal sheets or screens composed of, and/or are coated with, for example, but not limited to titanium, stainless steel, tantalum, platinum, gold, aluminum, cobalt nickel alloys, nickel alloys, highly alloyed ferritic stainless steel containing molybdenum and chromium, chromium alloys, and molybdenum-containing alloys, and combinations thereof. At least one cathode tab or conductor in this regard may be composed of similar materials, in illustrative embodiments, and is configured as a solid thin tab extending from, and electrically connecting, the cathode current collector sheets or screens.

Along the same line, the cathode plates of the present invention, in some embodiments, contain a solid cathode active material composed of a carbonaceous structure and/or include one or more metals, metal oxides, mixed metal oxides, metal sulfides, and combinations thereof. These metal oxides, mixed metal oxides, and metal sulfide composites are produced via chemical addition, reaction, or otherwise intimate contact of various metal oxides, metal sulfides and/or other metal elements, typically through thermal treatment processing, gel-sol formation, chemical vapor deposition or hydrothermal synthesis in mixed states, and various combinations of the foregoing techniques. The active cathode materials accordingly produced therefore contain group IB, IIB, IIIB, IVB, VB, VIB, VIIB, VIIB, and VIII metals, oxides, and/or sulfides, which also includes noble metals, other oxide compounds, and sulfide compounds. In illustrative embodiments, the cathode active material is constituted from at least silver and vanadium.

In suitable embodiments, the mixed metal oxide is a transition metal oxide having the general formula $SM_xV_2O_y$, where "SM" is a metal selected from Groups IB to VIIB, and VIII, as outlined above, with "x" ranging from about 0.3 to 2, and "y" ranging from about 4.5 to 6. A non-limiting exemplary cathode active material, in some embodiments, entails silver vanadium oxide having the general formula $Ag_xV_2O_2O$ in any one of its constituent phases, e.g., β-phase silver vanadium oxide, where "x" is 0.35 and "y" is 5.8, γ-phase silver vanadium oxide, where "x" is 0.8 and "y" 5.4, and ε-phase silver vanadium oxide, where "x" is 1 and "y" is 5.5, and combinations and mixtures thereof. For additional reference with respect to such cathode active materials, reference is made to U.S. Pat. Nos. 4,310,609 and 4,391,729, both to Liang at al., U.S. Pat. No. 5,545,497 to Takeuchi et al., U.S. Pat. No. 5,695,892 to Leising et al., U.S. Pat. No. 6,221,534 to Takeuchi et al., U.S. Pat. No. 6,413,669 to Takeuchi et al., U.S. Pat. No. 6,558,845 to Leising et al., U.S. Pat. No. 6,566,007 to Takeuchi et al., U.S. Pat. No. 6,685,752 to Leising at al., U.S. Pat. No. 6,696,201 to Leising et al., and U.S. Pat. No. 6,797,017 to Leising et al., all of which are hereby incorporated by reference in their entirety. Along the same lines, other preferred composite transition metal oxide cathode active materials include, but are not limited to, copper silver vanadium oxide (CSVO), which is described in U.S. Pat. Publication No. 2015/0147647 to Gan et al., U.S. Pat. Nos. 5,472,810 and 5,516,340, both to Takeuchi et. al., both of which are hereby incorporated by reference in their entirety.

Cathode active materials may also be composed of carbonaceous compounds prepared from carbon and fluorine, which includes, but is not limited to, graphitic and nongraphitic forms of carbon, such as, for example, coke, charcoal, and activated carbon, and combinations thereof. Fluorinated carbon is represented by the formula $(CF_x)$, where "x" ranges from about 0.1 to about 1.9, and preferably from about 0.5 to about 1.2, and $(C_2F)_n$, where "n" is the number of monomeric units, which can vary widely. U.S. Pat. No. 8,685,568 to Krehl et al. describes a Li/$CF_x$ cell that is in accord with the cathode active materials of the present invention, and is incorporated herein by reference in its entirety. When the cathode active material is a fluorinated carbon, moreover, a titanium cathode current collector may be employed, where a thin layer of graphite-carbon material, iridium, iridium oxide, or platinum, and combinations thereof, are applied thereto in some embodiments. Additional cathode active materials include, for example, but are not limited to, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

Prior to cathode plate fabrication, the cathode active material is mixed with a binder material in illustrative embodiments. Non-limiting examples of such binder materials include powdered fluoro-polymers, powdered polytetrafluoroethylene (PTFE), and powdered polyvinylidene fluoride (PVF), which range from about 1 to about 5 by weight percentage in the cathode mixture. In illustrative embodiments, a conductive diluent is also contained within the cathode mixture from about 0.1 to about 10 percent by weight to enhance conductivity. Suitable diluent materials in this regard include, but are not limited to, acetylene black graphite, carbon black graphite, and metallic powders such as, for example, powdered nickel, aluminum, titanium, and stainless steel in some embodiments. The cathode active materials are accordingly borne out of mixtures that include, but are not limited to, for example, a powdered fluoro-polymer binder and a conductive diluent, both present in the mixture at about 3 percent by weight for each composition, and the cathode active material present in the mixture at about 94 percent by weight in some embodiments.

In some embodiments, the cathode plates and/or the anode plates are substantially enveloped by a separator. In addition to the insulator materials, which are more fully described above and hereinafter, the separator materials of the present invention possess a degree of porosity sufficient to allow electrolyte ion flow therethrough, i.e., during the internal electrochemical reactions of the cell. Illustrative separator materials in this respect include, but are not limited to, fabrics woven from fluoropolymeric fibers, such as, for example, polyethylenechlorotrifluoroethylene, polyethylenetetrafluoroethylene, and polyvinylidene fluoride (PVDF), which are used either alone or in laminate with a fluoropolymeric microporous film, non-woven glass, polypropylene, polyethylene, glass fiber materials, ceramics, a polytetrafluoroethylene membrane commercially available under the designation ZITEX® (Chemplast. Inc.), a polypropylene membrane commercially available under the designation CELGARD® (Celanese Plastic Company, Inc.), a paper membrane commercially available under the designation DEXIGLAS (C.H. Dexter, Div., Dexter Corp.), and/or a polymeric membrane commercially available from Tanen Chemical Corp. under the designation TONEN®, and various combinations thereof.

Turning to the insulator compartment 205, see generally, embodiments 100, 200, 201, 300, 400 which resides between the cathode 335 and the casing, and in particular the lid 150, it functions in some embodiments to house at least one cathode tab 380 conductively connected to the terminal pin 160, 260, 360. The insulator compartment, moreover, is constructed of a first insulator member 155 having a first surrounding sidewall 455 meeting a first major face wall 415, 210 where the first major face wall is disposed adjacent to an inner surface 615 of the lid 650 with the first surrounding sidewall 455 extending towards the cathode 335, and where the first major face wall 415, 210 has a first opening 425 for the terminal pin 460.

A second insulator member 130, 340 concludes the structural features of the insulator component in some embodiments. Briefly, the second insulator member has a second surrounding sidewall 175, 375 meeting a second major face wall 135, where the second major face wall is disposed adjacent to the cathode perimeter edge with the second surrounding sidewall 175, 375 extending towards the lid 150, where the second major face wall 135 has a second opening or window 145, 345 for receiving at least one cathode tab 380, 680, and other cathodic components as detailed herein.

The first and second insulator members are matable in this respect with a first outer edge of one of the first and second surrounding sidewalls facing the other of the first and second major face walls and with at least a portion of the second surrounding sidewall being in an overlapping, direct contact relationship with at least a portion of the first surrounding sidewall to thereby form the insulator compartment 205. In illustrative embodiments, the insulator compartment 205 resides between the cathode 335 and the lid 150, 450 to house at least one cathode tab 380, 680, conductively connected to the terminal pin 560, 660.

Certain embodiments of the present invention entail an insulator assembly, see generally, 100, 200, 201, 400. In this regard, these assemblies include a first insulator member 155 having a first surrounding sidewall 455 meeting a first major face wall 415, where the first major face wall is disposed adjacent to an inner surface of a lid with the first surrounding sidewall extending towards a cell stack assembly. The cell stack assembly 125, 235, in accord with the foregoing, entails a lithium anode 225, a cathode 335, and at least one separator disposed between the anode and the cathode to prevent direct physical contact. The insulator assemblies in this respect have a second insulator member 130, 340 having a second surrounding sidewall 175, 375 meeting a second major face wall 135, where the second major face wall is disposed adjacent to a perimeter edge of the cell stack assembly with the second surrounding sidewall extending towards the lid, and where the second major face wall has a window 145, 345.

As briefly discussed above, lithium anode 225 of the present invention, is supported on an anode current collector, in illustrative embodiments, where at least one anode lead 115, 215, 315 conductively connects the anode to the casing. Likewise, the insulator assemblies include a cathode 335 entailing a cathode active material supported on a cathode current collector, where the cathode current collector includes at least one cathode tab 380, 680, extending outwardly beyond a perimeter edge of the cathode. The at least one cathode tab 380, 680, moreover, is conductively connected to a terminal pin 360 extending through an opening 425 in the first major sidewall and the lid 420, the cathode tab 380, 680 and terminal pin 360 being electrically insulated from the casing 370 in the insulator compartment 205. In some embodiments, the insulator compartment 205 resides between the cathode and the lid to house the at least one cathode tab conductively connected to the terminal pin.

In some embodiments, the electrode assemblies further entail at least two cathode plates 125, 335 each having a cathode tab 380, 680 conductively connected to the terminal pin 360 inside the insulator compartment 205, where at least a portion of the anode resides between the at least two cathode plates within a cell stack 230. In a related fashion, as briefly noted above, the anode 225 has a serpentine shape with at least two pairs of cathode plates interleaved between respective folds of the serpentine anode, and wherein each pair of cathode plates has a pair of cathode tabs housed inside the insulator compartment where they are conductively connected to a cathode bridge 120, which in turn is conductively connected to the terminal pin 160.

The cell stack has an upper surface, in suitable embodiments, where the upper surface possesses a plurality of cavities 235 operably configured to facilitate lithium cluster deposition therein. To this end, the cavities 235 are configured to facilitate the redistribution of lithium cluster deposits away from the cathodic components, including the insulator compartment 205, by providing an increased surface area and volumetric region for receiving such lithium cluster deposits. As such, the present invention provides for a plurality of cavities 235 such as, but not limited to, from about 1 to about 10 cavities. In addition to the upper surface positioning of such cavities, the cavities of the present invention may also be configured on or about any other cell stack surface, including, but not limited to, a bottom surface or region of the cell stack.

The insulator compartments of the present invention, in suitable embodiments, are composed of an electrically insulative material, which is also chemically inert with respect to the anode and cathode active materials. Likewise, such material is both chemically inert and insoluble with respect to the electrolyte, which is described in greater detail herein. To this end, illustrative embodiments of the present invention entail insulator materials that are substantially impervious to lithium ion flow, and selected from polyethylene, polyethylenechlorotrifluoroethylene, polypropylene, ETFE, and PTFE, and combinations thereof. As noted, the insulator materials provided herein are sufficient to prevent internal electrical short circuits, in conjunction with the embodiments described herein, and by way of non-limiting example, such insulator materials may also be composed of a thermoplastic fluoropolymer, such as, but not limited to HALAR® or TEFZEL®.

In illustrative embodiments, a perimeter gap 280 is presented, where the second major face wall 135 of the second insulator member 130 is disposed adjacent to the cathode perimeter edge to define the perimeter gap 280, or gap, that extends from the second surrounding sidewall 175 of the insulator compartment 205 to an inner surface of the container 105 sidewall, or insulator bag 165, when the electrode assembly is housed therein. In this respect, criteria have been established which define a critical lithium cluster as one that is large enough to bridge a gap between a negative polarity portion, such as any part of an electrochemical cell's casing sidewalls or anode leads and a region or component of positive polarity, such as the cathode array components as further described herein. As such, certain embodiments of the present invention concern Li/SVO cell designs in which the cathode terminal lead 160 is positioned over or about a cell stack, as further detailed herein, leaving from about 0.140 to about 0.150 inches from the casing walls to the outer edge of the encapsulation pocket sidewalls. In some instances, the insulator compartment or encapsulation pocket sidewalls are as close as from about 0.05 to about 0.112 inches from the container case wall 105.

Regarding the terminal pin 160, 260, 360, 460, 560, 660, which extends through an opening 420 in the lid, it is composed of molybdenum in some embodiments, where the pin is received by a coupling member 310, 670 that is conductively connected to the cathode tabs 680 of the present invention by a conductive ribbon 635 in certain embodiments. These embodiments further entail such components housed within the insulator compartment 205, as further detailed above and herein. The terminal pin, moreover, is supported in a ferrule 220, 320 by an electrically insulating material, the ferrule being electrically connected to the casing. In some embodiments, an insulator bag 165 partially envelopes the electrode assembly 125 in the cell stack 170. In accord with the foregoing, insulator compartment, and the insulator bag, in illustrative embodiments, are composed of a material that is substantially impervious to lithium ion flow, and selected from the group consisting of polyethylene, ETFE, PTFE, polyethylenechlorotrifluoroethylene, and polypropylene, and combinations thereof.

Following along the same lines, the present invention provides for an electrolyte in the casing to activate the electrochemical cell. The electrolyte, in illustrative embodiments, is a nonaqueous, ionically conductive electrolyte that serves as a medium for migration of ions between the anode and the cathode during electrochemical reactions of the cell. A suitable electrolyte has an inorganic, ionically conductive salt dissolved in a nonaqueous solvent, and more preferably, an ionizable lithium salt dissolved in a mixture of aprotic organic solvents comprising a low viscosity solvent and a high permittivity solvent. The salt serves as the vehicle for migration of the anode ions to intercalate or react with the cathode active materials. In illustrative embodiments, suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LIC_6F_5SO_3$, $LiO_2CCF_3$, $LiSO_6F$, $LiB(C_6H_5)_4$, and $LiCF_3SO_3$, and mixtures thereof.

Useful low viscosity solvents include esters, linear and cyclic ethers and dialkyl carbonates such as tetrahydrofuran, methyl acetate, diglyme, trigyime, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, and dipropyl carbonate, and mixtures thereof. Suitable high permittivity solvents include cyclic carbonates, cyclic esters, cyclic amides and a sulfoxide such as propylene carbonate, ethylene carbonate, butylene carbonate, acetonitrile, dimethyl sulfoxide, dimethyl formamide, dimethyl acetamide, y-valerolactone, y-butyrolactone, and N-methyl-pyrrolidinone, and mixtures thereof. In the present invention, the preferred anode active material is lithium metal, the preferred cathode active material is SVO, while the preferred electrolyte is 0.8 M to 1.5 M $LiAsF_6$ or $LiPF_6$ dissolved in a 50:50 mixture, or a 30:70 mixture, by volume, of propylene carbonate and 1,2-dimethoxyethane, in some embodiments.

As detailed above, the electrolyte of the present invention is provided in the casing to activate the electrochemical cell. In illustrative embodiments, the casing 105 is of a deep drawn configuration and composed of materials such as stainless steel, mild steel, nickel-plated mild steel, titanium, tantalum or aluminum, but not limited thereto, so long as the metallic material is compatible for use with the components of the present invention. In some embodiments, the electrode assembly has an uninsulated upper surface possessing a plurality of cavities operably configured to facilitate lithium cluster deposition thereon.

The present design of the electrochemical cell and insulator compartments or assemblies, therefore, redirects, reduces and/or prevents lithium cluster growth in proximity of the cathodic components of the electrochemical cell at least inasmuch as the insulator compartment 205 inhibits fluid flow communication of the electrolyte between the electrode assembly 125 and the at least one anode lead 115, 215, 315 conductively connected to the casing 105, 205 to an extent sufficient to prevent conditions favorable for the formation of lithium clusters between the electrode assembly and the at least one anode lead conductively connected to the casing.

Accordingly, the electrochemical cells of the present invention are dischargeable without lithium precipitating from the electrolyte in an amount sufficient to permit internal loading of the electrochemical cell. The foregoing and additional advantages and characterizing features of the present invention are buttressed by the foregoing and ensuing description, including a further explication of the figures and drawings, as follows.

Figure 1B:
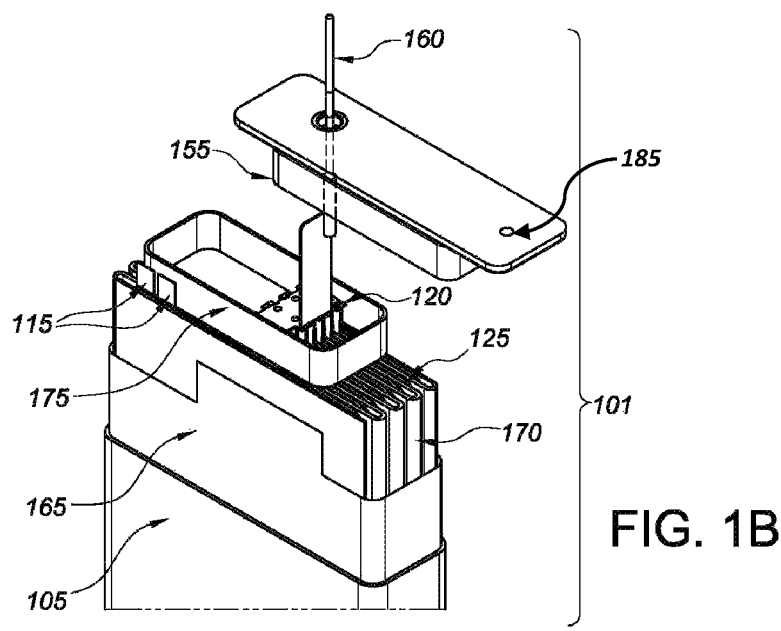
Figure 2B:
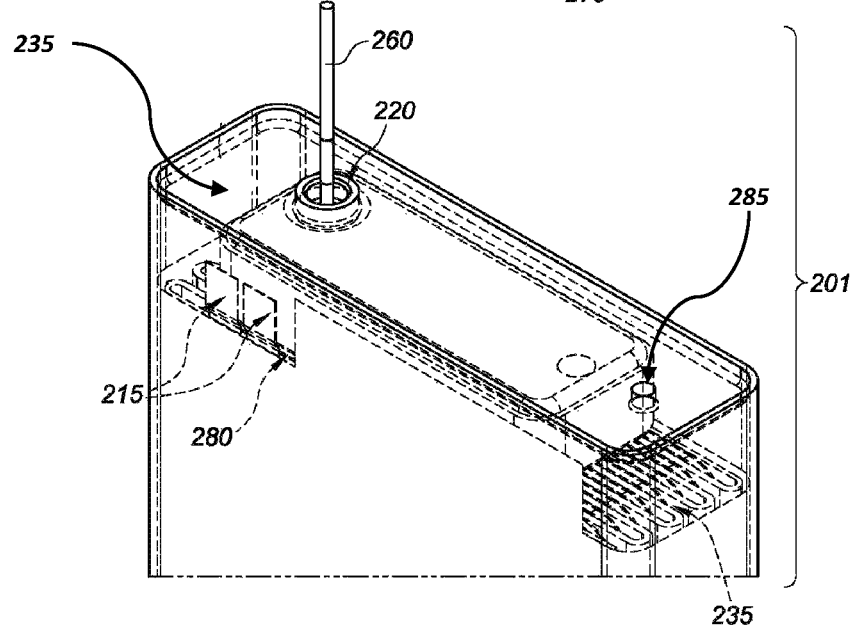
Figure 3:
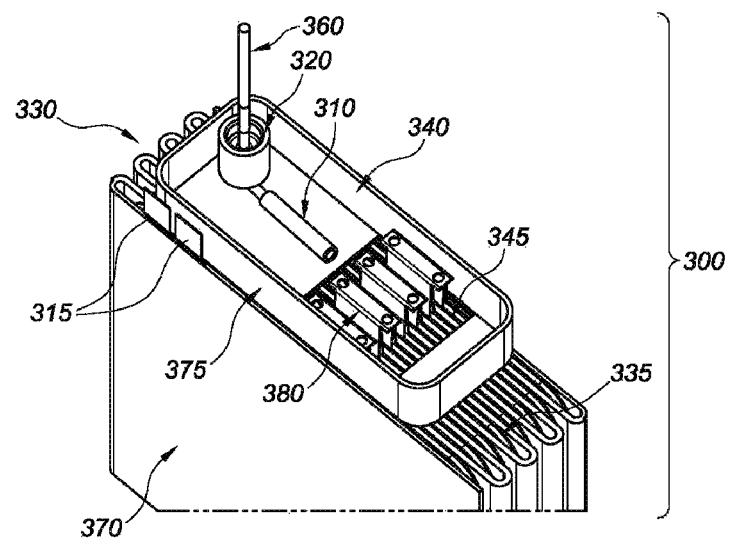
FIG. 3 is an open cross-sectional elevated view of illustrative representation 300 of a second insulator member resting on an upper surface of a cell stack assembly.
Figure 4:
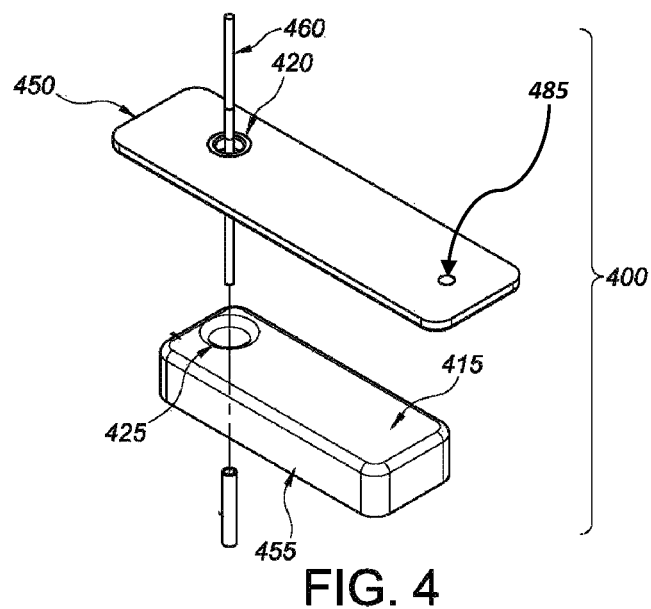
FIG. 4 is an isometric view of an illustrative representation concerning lid 450 and first insulator member 430 of the present invention.

Referring now in particular to the drawings, FIG. 1 shows an electrochemical cell assembly 100 (FIG. 1A) and 101 (FIG. 1B) for delivering high current pulses, which is particularly suited as a power source for an implantable cardiac defibrillator, and the like. Cells 100, 101 include hollow casing container 105, having an upper lip 110, where container 105 is configured to receive cell stack assembly or electrode assembly 170, having an upper uninsulated surface possessing cluster cavities 235 (FIGS. 2B and 3). Upper lip 110 is configured to receive lid 150, which is welded to the container and upper lip 110 in a known manner.

Casing container 105 is composed of, for example, but not limited to, a metal such as titanium or stainless steel, which imparts an electrically conductive terminal or contact, e.g., the anodic terminal in a case-negative design, for effecting an electrical connection between the cell and its load. Lid 450 possesses an opening 420 (see FIG. 4) and is similarly constituted of titanium, stainless steel or other suitable metal-based material or composite. Lid 150, moreover, is configured to cooperatively engage the container 105 after cell stack assembly 170, which is described in greater detail herein, has been received by the container 105. The corresponding electrical terminal or contact is provided by the cathodic conductor or terminal pin 160, 260, 360 extending from within cell 100, 101 through the first insulator member 155 and lid 150.

Figure 5:
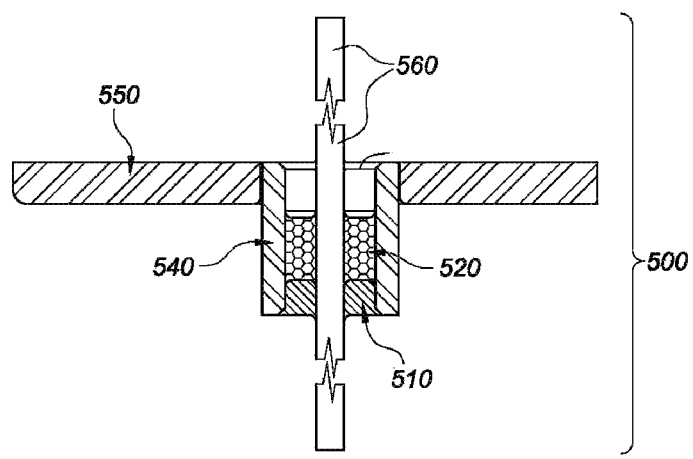
FIG. 5 is a cross-sectional view of an illustrative representation concerning lid 550, glass-to-metal seal 540 and terminal pin 560 with respect to the present invention.

The first insulator 155 member has a first major face wall 210, 415 (see FIGS. 2-4) that includes opening 425, and first sidewall portions 455 extending from the first foundation. Polymeric materials that are substantially impervious to lithium ion flow constitute the lid insulator composition, and include, but are not limited to, polyethylenechlorotrifluoroethylene, polypropylene, ETFE, PTFE, polyethylene, thermoplastic fluoropolymers HALAR® and/or TEFZEL® and combinations thereof. In this respect, the first insulator member 155 is composed of surrounding sidewall portions 455 and first major face wall 210, 415 as noted above, where the first major face wall abuts, and is connected or attached to, a region of lid 150 such that opening 420 of the lid and opening 425 of the first insulator member are substantially aligned, when connected or attached, to form a cathode terminal opening, which surrounds and partially encases ferrule 220 (see FIG. 2) or 320 (see FIG. 3), which is employed to buttress cathode terminal pin or lead 160, 260, 360 via an elastomeric polymer 510, 610 or glass insulating material 520, 620 or both, as shown in FIG. 5. As known by those skilled in the art, cathode terminal pin or lead 160, 260, 360, 460, 560, 660 is electrically insulated from the metal lid 150 via a glass-to-metal seal 540 in certain embodiments. In some embodiments, a plug (not shown) closes an electrolyte fill opening 185, 285, 485, 685 within the lid 150.

The glass used in the glass-to-metal seal is of a corrosion resistant type having up to about 50% by weight silicon such as CABAL 12, TA 23, FUSITE 425 or FUSITE 435, in some embodiments. The positive terminal pin preferably comprises titanium although molybdenum, aluminum, nickel alloy, or stainless steel, in certain embodiments. The lid is typically of a material similar to that of the casing. The cell is thereafter filled with the electrolyte solution described hereinabove and hermetically sealed.

Figure 6:
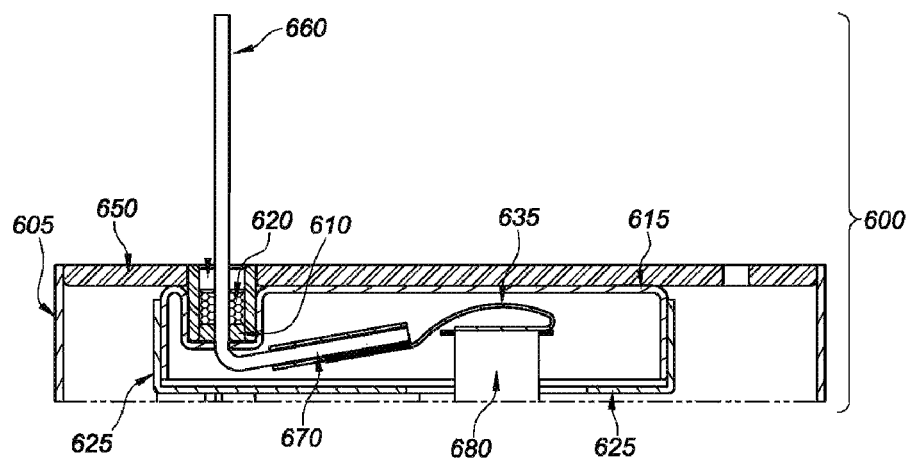
FIG. 6 is a cross-sectional elevated view of an illustrative representation of the components housed within insulator compartment 600 of the present invention.

More specifically with respect to FIG. 5 and FIG. 6, concerning the cathode terminal pin or lead 560, 660 in illustrative embodiments, the cathode terminal lead 560, 660 extends through the glass-to-metal seal 540, where it is electrically isolated from the lid casing 560, 660 in illustrative embodiments. The terminal lead in this respect is constructed such that its proximal end is configured with a curved region, see generally 600, to cooperatively engage an end of a coupling member 310, 670, which in some embodiments, is secured to an intermediate lead or conductive ribbon 635 for electrical connection to at least one cathode tab 680 and corresponding cathode bridge 120 (not shown in FIG. 2, 3, 5 or 6). Additional or alternative connection schemes with respect to the cathode terminal lead and the cathode current collector can be found in U.S. Pat. No. 5,750,286 to Paulot et al., which is incorporated by reference herein in its entirety.

Again referring to FIGS. 1-4, the second insulator member 130 is shown having an opening or window 145 within the second major face wall 135, where the second surrounding sidewall portions 375 (see FIG. 3) extends from the second major face wall 135, where window 145 is disposed adjacent to the cathode perimeter edge and contacts an upper region the of cell stack 125 such that the window 145 is positionable over or receives the at least one cathode tab 380 (see FIG. 3) and cathode bridge (not shown in FIG. 3). When second insulating member 130 and first insulating member 155 are engaged, the insulator compartment 205 (see FIG. 2) is formed such that the insulator compartment substantially envelopes the cathode components as generally shown in embodiment 600 to electrically insulate those components from the anode components and casing, e.g., anode leads 115, container 105 and lid 150.

The insulator compartment 205, sometimes referred to herein as an encapsulation pocket, is assembled or constructed, in illustrative embodiments, by providing a first insulator member 155 having a first surrounding sidewall 455 meeting a first major face wall 415, wherein the first major face wall has a first opening 425 for the terminal pin 460, and disposing the first major face wall 415 adjacent to an inner surface of the lid 450 with the first surrounding sidewall 455 extending towards the cathode. Subsequently, a second insulator member 130, 340 having a second surrounding sidewall 175 meeting a second major face wall 135 is provided, where the second major face wall 135 has a second opening 145 for the at least one cathode tab and bridge assembly 120. The second major face wall 135 is disposed, in illustrative embodiments, adjacent to the cathode perimeter edge with the second surrounding sidewall 175 extending towards the lid 150.

The insulator compartment assembly is constructed by mating a first outer edge of one of the first and second surrounding sidewalls facing the other of the first and second major face walls such that at least a portion of the second surrounding sidewall overlaps and is in direct contact with at least a portion of the first surrounding sidewall to thereby form the insulator compartment 205. In short, the first and second insulator members are matable in this regard, where a first outer edge of one of the first and second surrounding sidewalls facing the other of the first and second major face walls and with at least a portion of the second surrounding sidewall being in an overlapping, direct contact relationship with at least a portion of the first surrounding sidewall to thereby form the insulator compartment.

In concert with the formation of the encapsulation pocket assembly or insulator compartment 205 (see FIG. 2), this engaged configuration defines an overlapping compression junction, wherein an end surface of the first surrounding sidewall portions of the first insulator member substantially abuts the second major face wall of the second insulator member in the engaged configuration. Put simply, the first major face wall 415 (see FIG. 4) has a surface area and the second major face wall 135 has a surface area, where the surface area of the second major face wall is greater than the surface area of the first major face wall such that the encapsulation pocket can be formed, in the engaged configuration, i.e., when second surrounding sidewall portions 175 of the second insulator member overlap the first surrounding sidewall portions 455 of the first insulator member.

Figure 2A:
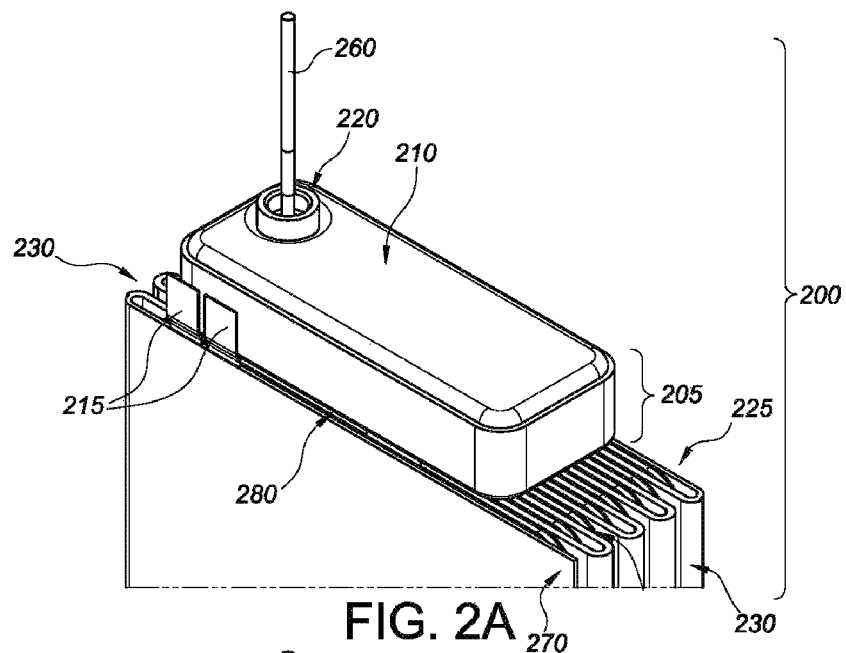
FIGS. 2A-2B show elevational views of illustrative representations concerning an encapsulation pocket or insulator compartment of the present invention.

The electrochemical cells, as shown in FIGS. 1-2, in illustrative embodiments, contain a perimeter gap 280 between an interior surface of the container 105 and an outside surface of the second surrounding sidewall portions 175 of the second insulator member. Along with the configuration of the window 145 of the second insulator member, perimeter gap 280 is operably configured to facilitate lithium cluster dispersion and deposition in and on cavities 235. In this regard, the size of the perimeter gap—between the container casing and the second surrounding sidewall portions 175 of the second insulator member—ranges from about 0.001, 0.01, 0.1, 1, 0.25, 0.5, 0.75, 1, 3, 5, 7, 9, 10, 15, 20, 30, 50, 100, 500, or 900 cm or inches to about from 0.1, 0.25, 0.5, 0.75, 1, 3, 5, 7, 9, 10, 15, 20, 30, 50, 100, 500, or 900 cm or inches in some embodiments. In illustrative embodiments, the size of the perimeter gap is from about 0.1 to 0.3 inches. In some embodiments, the electrode assembly has an uninsulated upper surface possessing a plurality of cavities operably configured to facilitate lithium cluster deposition thereon. In some embodiments, the electrode assembly has an uninsulated upper surface possessing a plurality of cavities operably configured to facilitate lithium cluster deposition thereon.

Referring back to the window 145 of the second major face wall 135 of the second insulator member, in certain embodiments, the opening or window 145 has a length and a width sufficient to receive a cathode components, such as, for example, at least one cathode tab and cathode bridge assembly 120, i.e., when the second major face wall 135 contacts a region of the cell stack upper surface 125. Here, one or both of the length and width of the window has dimensions ranging from about 0.001, 0.01, 0.1, 1, 0.25, 0.5, 0.75, 1, 3, 5, 7, 9, 10, 15, 20, 30, 50, 100, 500, or 900 cm or inches to about from 0.1, 0.25, 0.5, 0.75, 1, 3, 5, 7, 9, 10, 15, 20, 30, 50, 100, 500, or 900 cm or inches in some embodiments. In suitable embodiments, the dimensions of the window 145 of the cell second major face wall 135 are from about 0.26 inches in length or width to from about 0.28 inches in length or width, such that the window 145 is positionable over or receives the at least one cathode tab 380 cathode bridge 120.

Along the same lines, the window 145 is configured to further extend beyond an outer periphery thereof to define an uncovered or uninsulated region 345, where the uncovered or uninsulated region is operably configured to prevent lithium cluster formation within the insulator compartment in concert with a plurality of cavities 235. In this respect, the total surface area of the uncovered or uninsulated region, and/or sub-regions thereof, has dimensions, i.e., length, width and/or height, ranging from about 0.001, 0.01, 0.1, 1, 0.25, 0.5, 0.75, 1, 3, 5, 7, 9, 10, 15, 20, 30, 50, 100, 500, or 900 cm, cm$^2$, inches, or inches squared to about from 0.1, 0.25, 0.5, 0.75, 1, 3, 5, 7, 9, 10, 15, 20, 30, 50, 100, 500, or 900 cm, cm$^2$, inches, or inches squared, in some embodiments.

The anode-cathode subassembly 125, including the cathode components as detailed above and herein, is provided in connection with at least FIGS. 1-3. In particular, the electrochemical cells of the present invention, in some embodiments, entail a lithium anode battery design having a cell stack assembly 230 with a plurality of cathode plates with anode sections interposed therebetween 230. Each of the cathode components or plates in this respect, are composed of a cathode active material, for example, but not limited to, silver vanadium oxide, copper silver vanadium oxide, manganese dioxide, cobalt oxide, nickel oxide, copper oxide, titanium disulfide, copper sulfide, iron sulfide, iron disulfide, copper vanadium oxide, carbon, fluorinated carbon, vanadium oxide, $LiCoO_2$, $LiNiO_2$, $LiMn_2O_4$, $Ag_2O$, $Ag_2O_2$, $CuF_2$, $Ag_2CrO_4$, and combinations thereof, and a binder such as, for example, Teflon, which is then enclosed in an envelope of separator material, for example polypropylene or polyethylene.

Typically, there is a common cathode current collector or conductor for two or more adjacent plates, while the anode components entail elongated lithium plates or structures pressed together against opposite sides of an anode current collector or a conductor to form an elongated anode structure which is encapsulated in separator material, such as the aforementioned polypropylene or polyethylene. The anode structure is folded at spaced intervals along the length thereof to form a serpentine-like structure as shown most clearly in FIGS. 2-3 to receive between the folds thereof the plurality of cathode plate. The upper surface of cell stack 170, 270, 370 shows the anode structure provided with anode lead tabs 115, 215, 315 of for making electrical connection to the conductive casing base compartment 105 as described herein.

The electrochemical cells of the present invention, as shown in at least FIGS. 1-4, further include an insulator bag 165 partially enveloping the cell stack, in some embodiments. In particular, lithium battery designs entail, in certain embodiments, a cell stack assembly comprising a plurality of cathode plates with anode sections interposed therebetween was placed into a bag of insulating material. The insulating bag 165 is provided, being formed according to well-known techniques for making articles from thin-walled plastic material. A preferred material for bag 165 also is Tefzel material. Then bag 165 is positioned in place with the base thereof extending over the end of cell stack assembly, where, in illustrative embodiments, the insulated cell stack assembly is subsequently placed in the casing base compartment container 105 before lid 150 with attached or connected first insulator member 155 is welded to complete an illustrative deep drawn casing structure of the present invention.

Methods and Applications

In one aspect, the present disclosure provides a method of preventing, reducing, or redistributing lithium clusters in an electrochemical cell. Briefly, such processes entail, in illustrative embodiments, the steps of providing a casing having a container having a sidewall extending to an opening end, and a lid configured to close the opening end. The methods further include providing an electrode assembly that includes an anode of lithium supported on an anode current collector, and at least one anode lead, while also providing a cathode having a terminal pin extending through an opening in the lid, and a cathode active material supported on a cathode current collector, where the cathode current collector includes at least one cathode tab extending outwardly beyond a perimeter edge of the cathode. At least one separator positioned between the anode and the cathode to prevent direct physical contact is also provided in suitable embodiments.

The methods further include the steps of providing an insulator compartment residing between the cathode and the lid, where the at least one cathode tab and at least a portion of the terminal pin in the insulator compartment is accordingly housed therein. Next, the at least one anode lead is electrically connected to the casing as the anode terminal, while the steps also include electrically connecting the at least one cathode tab to the terminal pin. Thereafter, the container is closed by securing the lid to provide the casing housing the electrode assembly, where the electrode assembly is activated with an electrolyte provided in the casing.

The insulator compartment assembly is constructed by mating a first outer edge of one of the first and second surrounding sidewalls facing the other of the first and second major face walls such that at least a portion of the second surrounding sidewall overlaps and is in direct contact with at least a portion of the first surrounding sidewall to thereby form the insulator compartment 205. In short, the first and second insulator members are matable in this regard, where a first outer edge of one of the first and second surrounding sidewalls facing the other of the first and second major face walls and with at least a portion of the second surrounding sidewall being in an overlapping, direct contact relationship with at least a portion of the first surrounding sidewall to thereby form the insulator compartment.

EXAMPLES

The present invention will be understood more readily by reference to the following examples, which are provided by way of illustration and are not intended to be limiting in any way.

Example 1—Test Design

New insulator designs were tested to evaluate their ability to prevent lithium cluster shorts. Various experimental designs, and control cells, were built, which underwent testing pursuant to harsh "worst case" lithium cluster conditions. The new designs employ overlapping insulator compartments as discussed above, to prevent clusters from entering the insulation pocket, i.e., around the cathode bridge and pin. The new designs also create cluster cavities at either end of the cell, which are un-insulated portions of the case and lid that permit cluster growth in such non-critical areas of the cell.

Cells were tested per standard discharge parameters, where background is applied prior to the first pulse train, between each pulse train, and then after the final pulse train. The pulse current density was performed within standard protocol ranges. Discharge testing was performed in a "pin down" orientation, which is a 180° rotation in comparison to the electrochemical cells depicted in FIGS. 1-3, for example. All cells were oriented in a "pin up" orientation after completion of this aspect of the testing. See, e.g., FIG. 1.

Example 2—Test Results

Cells were discharge tested as outlined in a pin down orientation. The results are detailed below and with respect to Table 1. Typically, "slow" or erratic voltage recovery data indicates that a tested cell shorted during its respective test. Post-test microcal was performed in any event to confirm shorts. All cells showed rising voltage between EOT and start of DA between standard testing ranges except for certain cells that shorted during testing. The results are as follows.

TABLE 1

| Test Identifier (FIG.) | Cell Design | Results (No. of Shorts) |
| --- | --- | --- |
| Design "C" | Controls | 3/8 |
| Design/Test 2 | Embodiment 1 | 0/8 |
| Design/Test 3 | Embodiment 2 | 0/8 |

Example 3—Observational (DA) Results

Regarding this example, part of the electrochemical cell casing was removed or peeled back to expose side views of the lid area for controls and Embodiments 1-2, as noted above, after the testing was performed. In general, the clusters formed at the lid and in the cluster cavities at both ends of the cell (data not shown). Elevated views of the cell stack and first insulator member for all cells were also studied to ascertain the extent and location of the lithium cluster formation for both the controls and experimental designs, i.e., Embodiments 1-2. With respect to the control cells, cluster formation was observed inside the lid insulator for five cells (data not shown).

Concerning Embodiments 1 and 2 (Designs 2 and 3), however, essentially no cluster formation was observed in the insulator compartment other than nominal precipitation in two cells, where each had a single isolated cluster therein (data not shown). Design 3 cells did appear to have some nominal scattered cluster formation underneath the cell stack insulator or the second insulator compartment and near the cathode bridge, but outside the insulator compartment. The cathode bridge from each end of cell Designs 1 and 2 was also studied subsequent to testing, where lithium cluster formation was observed on top of the anode, inside the anode separator, and at the base of the cathode bridge (data not shown).

Example 4—Analysis of Shorted Cells and Discussion

As reported above, control cells showed internal short circuit behavior during electrical discharge testing, i.e., three of the controls designs. The most likely cause of shorts for the three control cells appeared to be due to cluster growth between the case/anode leads and the cathode pin/cathode lead. Significant cluster growth between these areas for all three of these cells was observed (data not shown).

In sum, overlapping insulator compartments that form a cathode insulation "pocket" are effective at preventing clusters from entering the pocket. The most efficacious cell designs—Designs 2 and 3, i.e., Embodiments 1 and 2, respectively—are highly similar, and showed no shorts during testing. These designs showed little to no clusters inside the cathode insulator compartment or "pocket" after testing. As such, because Designs 2 and 3 successfully blocked lithium clusters and prevented shorts, each design is viable for the purposes detailed herein.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

All references cited herein are incorporated by reference herein in their entireties and for all purposes to the same extent as if each individual publication, patent, or patent application was specifically and individually incorporated by reference in its entirety for all purposes.

What is claimed is:
1. An electrochemical cell, comprising:
  a) a casing comprising:
    i) a container having a sidewall extending to an open end; and
    ii) a lid closing the open end of the container, wherein a terminal pin extends through an opening in the lid, the terminal pin being in non-conductive relation with the lid;
  b) an electrode assembly housed inside the casing, the electrode assembly comprising:
    i) an anode comprising lithium supported on an anode current collector, wherein the anode current collector comprises at least one anode lead conductively connected to the casing;
    ii) a cathode comprising a cathode active material supported on a cathode current collector, wherein the cathode current collector comprises a cathode tab extending outwardly beyond a perimeter edge of the cathode current collector, the perimeter edge from which the cathode tab extends being spaced closer to the lid than a remainder of the cathode current collector; and iii) at least one separator positioned between the anode and the cathode to prevent direct physical contact between them;

c) an insulator compartment comprising:

i) a first insulator member having a first surrounding sidewall extending from a first major face wall to a first outer edge, the first major face wall being disposed adjacent to an inner surface of the lid with the first surrounding sidewall extending away from the lid toward the perimeter edge of the cathode current collector, wherein the terminal pin extends through a first opening in the first major face wall; and ii) a second insulator member having a second surrounding sidewall extending from a second major face wall to a second outer edge, the second major face wall being disposed adjacent to the perimeter edge of the cathode current collector with the second surrounding sidewall extending away from the perimeter edge toward the lid, wherein the cathode tab extends through a second opening in the second major face wall, iii) wherein the first and second insulator members are mated to each other with one of the first and second outer edges of the first and second surrounding sidewalls facing the other of the first and second major face walls so that at least a portion of the second surrounding sidewall is in an overlapping, direct contact relationship with at least a portion of the first surrounding sidewall to thereby form the insulator compartment residing between the perimeter edge and the lid, and iv) wherein the terminal pin is connected to the cathode tab in the insulator compartment; and d) an electrolyte provided in the casing to activate the electrode assembly.

2. The electrochemical cell of claim 1, wherein the terminal pin is composed of molybdenum.

3. The electrochemical cell of claim 1, wherein the insulator compartment defines a perimeter gap with respect to an inner surface of the container sidewall.

4. The electrochemical cell of claim 1, wherein the electrode assembly further comprises at least two cathode plates, each cathode plate having a cathode tab conductively connected to the terminal pin inside the insulator compartment, and wherein at least a portion of the anode resides between the at least two cathode plates.

5. The electrochemical cell of claim 1, wherein the anode has a serpentine shape with at least two pairs of cathode plates interleaved between respective folds of the serpentine anode, and wherein each pair of cathode plates has a cathode tab housed inside the insulator compartment where the cathode tabs corresponding to each of the at least two pairs of cathode plates are conductively connected to a cathode bridge, and wherein the cathode bridge is conductively connected to the terminal pin in the insulator compartment.

6. The electrochemical cell of claim 5, wherein the second opening in the second major face wall of the second insulator member is configured to receive the cathode tabs and the cathode bridge and to further extend beyond an outer periphery of the cathode tabs and the cathode bridge to define an uncovered region of the electrode assembly.

7. The electrochemical cell of claim 1, wherein one of the first outer edge of the first insulator member and the second outer edge of the second insulator member contacts the other of the first and second major face walls.

8. The electrochemical cell of claim 1, wherein the electrode assembly has an uninsulated upper surface possessing a plurality of cavities.

9. The electrochemical cell of claim 1, wherein the cathode active material is selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, $CF_x$, copper oxide, and copper vanadium oxide, and mixtures thereof.

10. The electrochemical cell of claim 1, wherein a gap extends from an outer-most one of the first surrounding sidewall of the first insulator member and the second surrounding sidewall of the second insulator member to an inner surface of the container sidewall.

11. The electrochemical cell of claim 1, wherein the terminal pin extending through the opening in the lid is supported in a ferrule by an electrically insulating material, the ferrule being electrically connected to the casing.

12. The electrochemical cell of claim 1, wherein an inner portion of the terminal pin is received in a couple that is conductively connected to the cathode tab in the insulator compartment by a conductive ribbon.

13. The electrochemical cell of claim 1, wherein the first and second insulator members are composed of a material that is impervious to lithium ion flow therethrough and which is selected from the group consisting of polyethylene, polyethylenechlorotrifluoroethylene, polypropylene, ETFE, and PTFE, and combinations thereof.

14. The electrochemical cell of claim 1, further comprising an insulator bag at least partially enveloping the electrode assembly.

15. The electrochemical cell of claim 1, wherein the casing is configured as a deep drawn casing structure.

16. The electrochemical cell of claim 1, wherein the insulator compartment inhibits fluid flow communication of the electrolyte between the at least one anode lead conductively connected to the casing and the remainder of the electrode assembly.

17. The electrochemical cell of claim 1 being dischargeable without lithium precipitating from the electrolyte in an amount sufficient to permit internal loading of the electrochemical cell.

18. An electrochemical cell, comprising:

a) a casing comprising:

i) a container having a sidewall extending to an open end; and ii) a lid closing the open end of the container, wherein a terminal pin extends through an opening in the lid, the terminal pin being in non-conductive relation with the lid;

b) an electrode assembly housed inside the casing, the electrode assembly comprising:

i) an anode comprising lithium supported on an anode current collector, wherein the anode current collector comprises at least one anode lead conductively connected to the casing;

ii) a cathode comprising a cathode active material supported on a cathode current collector, wherein the cathode current collector comprises a cathode tab extending outwardly beyond a perimeter edge of the cathode current collector, the perimeter edge from which the cathode tab extends being spaced closer to the lid than a remainder of the cathode current collector; and iii) at least one separator positioned between the anode and the cathode to prevent direct physical contact between them;

c) an insulator compartment comprising:
   i) a first insulator member having a first surrounding sidewall extending from a first major face wall to a first outer edge, the first major face wall being disposed adjacent to an inner surface of the lid with the first surrounding sidewall extending away from the lid toward the perimeter edge of the cathode current collector, wherein the first major face wall at least partially encases a ferrule comprising the glass-to-metal seal and wherein the terminal pin extends through a first opening in the first major face wall; and
   ii) a second insulator member having a second surrounding sidewall extending from a second major face wall to a second outer edge, the second major face wall being disposed adjacent to the perimeter edge of the cathode current collector with the second surrounding sidewall extending away from the perimeter edge toward the lid, wherein the second major face wall has a second opening for the cathode tab,
   iii) wherein the first and second insulator members are mated to each other with one of the first and second outer edges of the first and second surrounding sidewalls facing the other of the first and second major face walls so that at least a portion of the second surrounding sidewall is in an overlapping, direct contact relationship with at least a portion of the first surrounding sidewall to thereby form the insulator compartment, and
   iv) wherein the terminal pin is connected to the cathode tab in the insulator compartment; and
d) an electrolyte provided in the casing to activate the electrode assembly.

19. The electrochemical cell of claim 18, wherein the terminal pin is composed on molybdenum.

20. The electrochemical cell of claim 18, wherein the insulator compartment defines a perimeter gap with respect to an inner surface of the container sidewall.

21. The electrochemical cell of claim 18, wherein the cathode further comprises at least two cathode plates, each cathode plate having a cathode tab conductively connected to the terminal pin inside the insulator compartment, and wherein at least a portion of the anode resides between the at least two cathode plates.

22. The electrochemical cell of claim 18, wherein the anode has a serpentine shape with at least two pairs of cathode plates interleaved between respective folds of the serpentine anode, and wherein each pair of cathode plates has a cathode tab housed inside the insulator compartment where the cathode tabs corresponding to each of the at least two pairs of cathode plates are conductively connected to a cathode bridge, and wherein the cathode bridge is conductively connected to the terminal pin in the insulator compartment.

23. The electrochemical cell of claim 22, wherein the second opening in the second major face wall of the second insulator member is configured to receive the cathode tabs and the cathode bridge and to further extend beyond an outer periphery of the cathode tabs and the cathode bridge to define an uncovered region of the electrode assembly.

24. The electrochemical cell of claim 18, wherein one of the first outer edge of the first insulator member and the second outer edge of the second insulator member contacts the other of the first and second major face walls.

25. The electrochemical cell of claim 18, wherein the electrode assembly has an uninsulated upper surface possessing a plurality of cavities.

26. The electrochemical cell of claim 18, wherein the cathode active material is selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, $FeS$, $FeS_2$, $Ag_2O$, $Ag_2O_2$, $CuF_2$, $Ag_2CrO_4$, $CF_x$, copper oxide, and copper vanadium oxide, and mixtures thereof.

27. The electrochemical cell of claim 18, wherein a gap extends from an outer-most one of the first surrounding sidewall of the first insulator member and the second surrounding sidewall of the second insulator member to an inner surface of the container sidewall.

28. The electrochemical cell of claim 18 being dischargeable without lithium precipitating from the electrolyte in an amount sufficient to permit internal loading of the electrochemical cell.

29. The electrochemical cell of claim 18, wherein an inner portion of the terminal pin is received in a couple that is conductively connected to the cathode tab in the insulator compartment by a conductive ribbon.

30. The electrochemical cell of claim 18, wherein the first and second insulator members are composed of a material that is impervious to lithium ion flow therethrough and selected from the group consisting of polyethylene, polypropylene, ETFE, PTFE, and polyethylenechlorotrifluoroethylene, and combinations thereof.

31. The electrochemical cell of claim 18, further comprising an insulator bag at least partially enveloping the electrode assembly.

32. The electrochemical cell of claim 18, wherein the casing is configured as a deep drawn casing structure.

33. The electrochemical cell of claim 18, wherein the insulator compartment inhibits fluid flow communication of the electrolyte between the at least one anode lead conductively connected to the casing and the remainder of the electrode assembly.

34. A method for assembling an electrochemical cell, comprising the steps of:
a) providing a casing comprising:
   i) a container having a sidewall extending to an open end; and
   ii) a lid configured to close the open end, wherein a terminal pin extends through an opening in the lid, the terminal pin being in non-conductive relation with the lid;
b) providing an electrode assembly comprising:
   i) an anode comprising lithium supported on an anode current collector, wherein the anode current collector comprises at least one outwardly extending anode lead;
   ii) a cathode comprising a cathode active material supported on a cathode current collector, wherein at least one cathode tab extends outwardly beyond a perimeter edge of the cathode current collector; and
   iii) at least one separator positioned between the anode and the cathode to prevent direct physical contact between them;
c) providing an insulator compartment comprising:
   i) a first insulator member having a first surrounding sidewall extending from a first major face wall to a first outer edge, wherein the first major face wall has a first opening configured to receive the terminal pin; and
   ii) a second insulator member having a second surrounding sidewall extending from a second major face wall to a second outer edge, wherein the second major face wall has a second opening configured to receive the at least one cathode tab;

d) disposing the first major face wall of the first insulator compartment adjacent to an inner surface of the lid with the terminal pin extending through the first opening in the first insulator compartment;

e) disposing the second major face wall adjacent to the perimeter edge of the cathode current collector with the cathode lead extending through the second opening in the second insulator compartment;

f) moving the electrode assembly into the container through the open end thereof;

g) conductively connecting the at least one anode lead to the casing;

h) moving the lid into proximity with the electrode assembly and conductively connecting the cathode lead to the terminal pin, wherein the perimeter edge from which the cathode tab extends and which is adjacent to the second major face wall of the second insulator member is closer to the lid than a remainder of the cathode current collector; and i) mating the first and second insulator members to each other with one of the first and second outer edges of the first and second surrounding sidewalls facing the other of the first and second major face walls so that at least a portion of the second surrounding sidewall is in an overlapping, direct contact relationship with at least a portion of the first surrounding sidewall to thereby form the insulator compartment enveloping the at least one cathode tab connected to the terminal pin;

j) closing the open end of the container with the lid to provide the casing housing the electrode assembly; and k) activating the electrode assembly with an electrolyte provided in the casing.

35. The method of claim 34, including providing the insulator compartment defining a perimeter gap with an inner surface of the container sidewall.

36. The method of claim 34, including providing the electrode assembly having an uninsulated upper surface possessing a plurality of cavities.

* * * * *